United States Patent [19]

Gens

[11] 3,860,691

[45] Jan. 14, 1975

[54] ACTINIDE MONONITRIDE MICROSPHERES AND PROCESS

[75] Inventor: Theodore A. Gens, Oak Ridge, Tenn.

[73] Assignee: The United States of America as represented by the United States Atomic Energy Commission, Washington, D.C.

[22] Filed: Sept. 8, 1966

[21] Appl. No.: 578,428

[52] U.S. Cl.............. 423/254, 423/251, 423/252, 423/253, 252/301.1 S
[51] Int. Cl. ................. C01g 56/00, C01f 15/00
[58] Field of Search .............. 23/347, 343–345; 252/301.1

[56] References Cited
UNITED STATES PATENTS

| | | | |
|---|---|---|---|
| 3,218,032 | 10/1965 | Hammond | 23/347 X |
| 3,228,748 | 1/1966 | Accary et al. | 23/347 |

OTHER PUBLICATIONS

AECD, ORNL–3879, (Nov. 1965) pg. 1, 6 and 7.

Primary Examiner—Benjamin R. Padgett
Assistant Examiner—E. A. Miller
Attorney, Agent, or Firm—Robert M. Poteat; Irving Barrack; John A. Horan

[57] ABSTRACT

Crystalline microspheres containing actinide mononitride having a density of at least 90 percent of theoretical are prepared by converting sol-gel derived actinide oxidecarbon microspheres, which contain 1 gram atom carbon per gram atom oxygen, to carbide in argon at about 1,600°C and thereafter converting the carbide to the actinide mononitride in nitrogen at 1,500°–1,700°C. Alternately, the sol-gel derived actinide oxide-carbon microspheres are converted to the actinide mononitride by reacting same with nitrogen at 1,500°–1,700°C and thereafter thermally cycling the microspheres between the first temperature and 1,000°C at least once.

4 Claims, No Drawings

ACTINIDE MONONITRIDE MICROSPHERES AND PROCESS

The invention described herein was made in the course of, or under, a contract with the U.S. Atomic Energy Commission.

The present invention relates generally to particulate reactor fuels and more particularly to spherical mononitride reactor fuel particles and processes for making same.

While the carbide and oxide fuels have heretofore found widespread usage, the nitrides are potentially attractive. In terms of fissile material density, thermal conductivity, and thermal expansion, the nitrides are superior to the oxides. Moreover, the nitrides are less reactive with water than the carbides. Previously, the nitrides, such as for example, uranium mononitride, have been prepared in comparatively pure form by reacting stoichiometric mixtures of finely pulverized uranium dioxide and carbon in nitrogen by holding at 1,500° to 1700°C for 3 hours and cooling the product to room temperature in nitrogen or argon. Also, pellets of uranium mononitride have been fabricated by cold pressing to shape at 12,000 psi of 2-micron particles followed by sintering in vacuum at 1,850°C. These pellets were, however, of the order of 89 percent of theoretical density. The high pressures, ball-milling operations, and the handling of pyrophoric powders, along with the comparatively low theoretical densities obtainable have, thus far, reduced the desirability of utilizing nitrides as reactor fuels in competition with, for example, uranium dioxide.

It is therefore a primary object of this invention to provide spherical mononitride reactor fuel particles.

Another object is to provide dense microspheres of thorium, uranium and plutonium mononitrides having an average particle diameter from 100 to 600 microns.

Still a further object is to provide processes for preparing these microsphere fuels.

In accordance with the above and other objects, which are apparent to those skilled in the art, it has now been found that crystalline microspheres containing actinide mononitride can be prepared having essentially theoretical density, high crushing strength, and good size control.

By the term "microspheres" as used herein it is intended to refer to solid spherules prepared in accordance with the sol-gel process having average particle diameters ranging from about 100 up to 600 microns and being substantially free from voids. The actinide compounds from which the mononitride microspheres are prepared, in accordance with the invention, include uranium oxide, thorium oxide, plutonium oxide, uranium-thorium oxide, uranium-plutonium oxide and the like; similarly, the actinide mononitride product includes mononitrides of uranium, thorium, plutonium and mixtures thereof.

The preparation of these mononitride microspheres may be achieved in one of several methods. In a first method, actinide oxide-carbon gel microspheres are employed as the starting material. A recent method for preparing these gel microspheres from stable hydrous actinide sols is disclosed in Ser. No. 385,813, filed on July 28, 1964, in the name of Sam D. Clinton et al., for "Process and Apparatus for Preparing Oxide Gel Microspheres from Sols now U.S. Pat. No. 3,290,122." To use this method to prepare actinide oxide-carbon gel microspheres, a stable hydrous actinide oxide sol is intimately mixed with finely divided carbon and the resulting mixed sol dispersed into sol droplets by passage through a two-fluid nozzle into an organic-containing tapered column. It should be noted here that the carbon content of the sol droplets increases during the dispersing phase due to organic material pickup from the forming column. For instance, a sol containing 2.3 atoms of carbon per atom of uranium originally had a carbon to uranium ratio of 2.7 as dried gel microspheres after the forming phase. Upon congealing, the actinide oxide-carbon microspheres are collected at the bottom, removed, and dried in a stream of inert gas.

These actinide oxide-carbon microspheres, in accordance with the present invention, are first heated in argon at an elevated temperature to convert the oxide to the carbide and then heated in nitrogen maintained at atmospheric pressure to convert the carbide to the corresponding mononitride. For this two-step conversion, a typical reaction illustrated with uranium is:

$$UO_2 + 3C \rightarrow UC + 2CO \tag{1}$$

$$UC + \tfrac{1}{2}N_2 \rightarrow UN + C \tag{2}$$

As may be seen, 3 gram-atoms of carbon are required, stoichiometrically, per mole $UO_2$ and, if any $UO_3$ is present, 4 gram-atoms of carbon would be required per mole of $UO_3$.

While from the stoichiometry of reaction (1) only partial conversion to the carbide could be achieved with less than 3 gram-atoms of carbon per gram-atom of $UO_2$, applicant has found that essentially complete conversion to UN, free of carbon, is obtained with less than 3 gram-atoms of carbon. This is believed attributable to the fact that the carbon liberated from the carbide by reaction (2) is utilized in the conversion of the remaining $UO_2$ to UN. Accordingly, only 2 gram-atoms of carbon are required in this two-step process to convert $UO_2$ to UN (3 gram-atoms for $UO_3$ if present) or alternately one gram-atom of carbon for each gram-atom of oxygen. It is necessary, however, to keep the products at reaction temperature for about an additional three hours to permit carbon and $UO_2$ to diffuse together through the UN matrix produced by reactions (1) and (2).

While it is known that uranium dioxide powder can be reacted with carbon to form uranium carbide powder, it has, quite unexpectedly, been found that dense crystalline uranium mononitride microspheres of near theoretical density (up to about 95 percent of theoretical) could be prepared from correspondingly sized $UO_2$-carbon microspheres via an initial carbide reaction. Previous prior art work demonstrated that, when massive uranium carbide (up to 5,000 microns) was reacted with nitrogen, the UC fragmented into powder, thus completely destroying the macrostructure.

In an alternate method for preparing the novel mononitride microspheres, actinide oxide-carbon gel microspheres are employed as a starting material as in the first method. Instead of being converted to the carbide first by heating in an inert atmosphere, the microspheres are raised to the reaction temperature in a nitrogen atmosphere and thermally cycled at least once between the reaction temperature and a temperature of about 1,000°C. When the actinide oxide-carbon gel microspheres were heated in nitrogen to a reaction temperature of about 1,6000°C, the conversion to the nitride was only partially successful, with the interior of the microspheres remaining as the oxide. It was found that, by cycling the temperature between the reaction temperature and a lower temperature of about 1,000°C, essentially 100 percent conversion to the nitride was achieved in a period of about 3 to 5 hours. It was noted that the oxide gel microspheres, upon heating to the reaction temperature, became rapidly coated with a very thin, mirror-like layer of mononitride which impeded the interchange of nitrogen and carbon monoxide through the microspheres and thus prevented conversion to the nitride at the interior.

While applicant does not wish to be bound by any rigid theory, it is postulated that in this one-step process the temperature cycling renders the coating pervious to nitrogen by forming and decomposing higher nitrides. As the temperature is lowered from the reaction temperature, the mononitride does not remain stable in the presence of nitrogen. Rather, it was found to pick up nitrogen gradually, until, at 1,000°C and one atmosphere of nitrogen, for example, the equilibrium phase contained over 1.6 atoms of nitrogen per actinide atom. Reheating to 1,600°C decomposed the higher nitrides into the mononitride, disrupting the mononitride coating and permitting nitrogen to penetrate to the interior.

After the conversion is completed the mononitride microspheres are cooled. In order to preclude conversion of the mononitrides to higher nitrides, the atmosphere should be changed from nitrogen to an inert atmosphere such as argon.

The temperatures employed are not critical and may vary over a wide range. For the reaction temperature, a range from 1,500°C to 1,700°C, with 1,600°C being preferred, may be used and in the temperature cycling operation a lower temperature of about 1,000°C is suitable.

While applicant has found that dense actinide mononitride microspheres could be prepared, the invention is equally applicable to preparing mixed actinide carbide-nitride microspheres. As is known, mixed uranium carbide-uranium mononitride product can be prepared employing powdered reagents by careful control of the firing temperature, atmosphere and carbon content. A description of such a prior art method is detailed in AERE-M-1389, "The Preparation and Some Properties of Uranium Carbonitrides," D. A. Landsman et al., Apr. 1964. Also, the useful properties of such mixed compositions have been predicted theoretically by Rand, "Variation of Some Thermodynamic Properties Across the UC-UN Solid Solution Range," AERE-M-1360, Feb. 1964.

In carrying out such a process for preparing mixed actinide carbide-nitride microspheres the same UC-UN method employed in the one-step process is used. For example, mixed UC-UN microspheres could be prepared by utilizing an excess of carbon in the initial sol. By excess, it is meant that which is greater than that needed to reduce uranium oxide during the formation of the mononitride and additionally an amount desired as uranium carbide in the finished mixed UC-UN product. The uranium oxide-carbon gel microspheres are heated for about two hours in nitrogen at a temperature of about 1,600°C to convert the oxide to mixed UC-UN microspheres. It is then necessary, as noted hereinbefore, to expose the microspheres to a temperature cycle to overcome the problem of the gas impervious coating which is initially formed on the microspheres. Whereas before the process was allowed to proceed at atmospheric pressure, for the preparation of mixed UC-UN the partial pressure of the nitrogen is adjusted during firing to the equilibrium nitrogen pressure (at the temperature used) above the desired mixed UC-UN product. This equilibrium nitrogen pressure is readily calculated from equations derived by Rand, or deduced from the experiments performed by Landsman et al. To illustrate, where a 50–50 mixed UC-UN product is desired, the partial pressure of nitrogen should be only about $10^{-3}$ atm. at 1,500°C. Thus, by controlling the amount of carbon incorporated in the initial sol and the nitrogen partial pressure during firing, microspheres of mixed UN-UC, in any proportions, could be prepared.

Further illustration of the quantitative aspects and procedures of the present invention are given in the following examples. Example I illustrates the two-step process for preparing UN microspheres and Examples II and III demonstrate the ineffectual method of heating the oxide microspheres in nitrogen without the thermal cycling. Examples IV and V illustrate the effect of thermal cycling in the one-step process for preparing UN microspheres.

EXAMPLE I

Several batches of $UO_2$-carbon sols having a carbon-uranium atom ratio of 2.3:1 were prepared as follows: a 0.55 M $UO_2$ sol was made and 23 grams of Spheron 9 Carbon Black (a product of Cabot Corporation) were dispersed per liter of sol, using an ultrasonic generator and sonic converter device.

The $UO_2$-C sol was then formed into $UO_2$-C gel microspheres in a 2-inch diameter forming column which is described in Ser. No. 385,813 cited hereinbefore. The forming medium was a 94.5 vol. percent 2-ethyl-1-hexanol - 5 vol. percent 2-Octanol - 0.5 vol. percent Amine-0 mixture. The $UO_2$-C sol was fed into the gelling column through a two-fluid nozzle at flow rates of 1.2 to 2.5 cc/min., with a column backflow of the forming medium of 0.8 gal./min.

The sol droplets were partially dehydrated as they settled to the bottom of the column and dried in flowing argon at 120°C for 16 hours after removal from the column. Analysis of the gel spheres indicated a smooth surface and an average size of about 300 microns.

A 10 gram charge of the $UO_2$-C gel microspheres was placed in an alumina boat, heated in argon for 2 hours at 1,600°C to form carbide and then heated for 2 more hours in nitrogen (one atmosphere) at 1,600°C to form the mononitride. Chemical analyses indicated the product was substantially uranium mononitride (composition $UN_{0.8}C_{0.40}O_{0.24}$) and X-ray analysis revealed the presence of some $UO_2$. No carbide X-ray patterns were found. The microspheres (ranging from 100 to 200 microns) were silvery and well-shaped, having a toluene displacement density of 12.43 (compared with a theoretical density of 14.31 by X-ray measurement) and crush strengths (5 microspheres) between 270 and 410 grams.

It is important to note that the carbon present in the $UO_2$-C gel microspheres (C/U atomic ratio = 2.7) was not enough for reaction (1) to go to completion, since the reaction requires 3 atoms of carbon per mole of $UO_2$ and 4 atoms of carbon per mole of $UO_3$. Hence, where the correct amount of carbon for reaction (1) to go to completion is employed, essentially complete conversion to the mononitride by reaction (2) would be possible. Additional treatment, beyond the 2 hours in $N_2$ at 1,600°C, of the $UN_{0.8}C_{0.40}O_{0.24}$ product would cause further conversion to nitride, but this conversion is relatively slow because the carbon and oxygen must diffuse together through the UN matrix.

EXAMPLE II

A batch of $UO_2$-C gel microspheres prepared by the method employed in Example I was dried in a stream of argon at 600°C for 3 hours and a portion of these microspheres analyzed to determine the valences of the uranium in the gel microspheres as well as the carbon to uranium ratio. Quantitative analyses of these microspheres were made difficult by the fact that the microspheres absorb the surrounding atmosphere (argon) to the extent that they lost over 4 percent of their room-temperature weight when heated to 400°C. Average values indicated 39.7 weight percent $UO_2$ and 46.2 weight percent $UO_3$ and an average carbon to uranium atomic ratio of 2.7.

Several runs were made by placing a 10 gram charge of these $UO_2$-C microspheres in an alumina boat and heated in flowing nitrogen for various temperatures and heating periods. The results are shown in Table 1 below:

TABLE 1

Conversion of $UO_2$-C Microspheres to UN Microspheres

| Run | Temperature (°C) | Time (hr) | Product N/U Atomic Ratio |
|---|---|---|---|
| 1 | 1400 | 2 | 0.0 |
| 2 | 1500 | 2 | 0.62 |
| 3 | 1600 | 4 | 0.10 |
| 4 | 1600 | 4 | 0.36 |
| 5 | 1650 | 4 | 0.25 |
| 6 | 1650 | 4 | 0.20 |

From the results in Table 1 it may be seen that heating in a nitrogen atmosphere at high temperatures for long periods of time is ineffectual in achieving complete conversion of the $UO_2$-C microspheres to pure UN microspheres. It should be noted that, as the temperature decreased, the conversion (as evidenced by increased N/U atomic ratio) increased. However, at temperatures below about 1,500°C the reaction becomes impractically slow. Too, the lower conversions at the higher temperatures may result from a more dense UN coating on the surface of the gel microspheres which still further impeded the ingress of nitrogen into the interior of the oxide microsphere.

EXAMPLE III

A 10 gram batch of $UO_2$-C gel microspheres prepared by the method employed in Example I was heated in an alumina boat for 2 hours in flowing nitrogen at 1,600°C. Some were removed, cooled to room temperature under nitrogen and examined under a microscope. The microspheres were coated with silver-colored UN, while the interior of broken microspheres was the black color of carbon, $UO_2$ and uranium carbide, thus indicating the UN coating was impervious to the nitrogen gas resulting in incomplete conversion within the interior of the oxide microspheres.

EXAMPLE IV

The microspheres not removed from the furnace in Example III were cooled to 950°C with flowing nitrogen and held overnight at this temperature. The temperature was then increased to 1,600°C for 3 more hours. The microspheres were then cooled to room temperature in an argon atmosphere. X-ray analyses showed a mixed uranium nitride-uranium oxide product with no uranium carbide being identified.

It should be noted that complete conversion should not be attained, due to some contamination of the argon atmosphere by air during sampling after the first 2-hour treatment and the resulting reaction of the microspheres with air. Despite this unavoidable contamination of the argon, the nitrogen to uranium atomic ratio in the final product was 0.8, which was considerably higher than in previous comparable runs as shown in Example II. These results indicate that temperature cycling, in a nitrogen atmosphere at reaction temperatures, renders the UN coating pervious to nitrogen and affords conversion of the interior of the oxide gel microspheres to the nitride.

EXAMPLE V

A 10 gram batch of $UO_2$-C gel microspheres prepared by the method of Example I was placed in an alumina boat and heated in flowing nitrogen for 5 hours at 1,600°C. No samples were removed as in Example III after the first heating period, thus avoiding the air contamination. The microspheres were then cooled to 950°C in flowing nitrogen, held overnight and heated to 1,600°C for 3 more hours.

The microspheres were then cooled to room temperature in argon and analyzed. The nitrogen to uranium atomic ratio was 0.92 with a product composition of $UN_{0.92}C_{0.13}$ with no oxide present. The density, measured by toluene displacement, was 13.7.

It is to be understood that the foregoing examples are merely illustrative and are not intended to limit the scope of this invention, but the invention should be limited only by the scope of the appended claims.

What is claimed is:

1. A method for preparing crystalline microspheres consisting essentially of actinide mononitride having one gram atom carbon per gram atom oxygen comprising reacting actinide oxide-carbon microspheres with nitrogen at a first temperature between 1,500°–1,700°C and thereafter thermally cycling said reacted microspheres in a nitrogen atmosphere between said first temperature and 1,000°C at least once.

2. The method of claim 1 wherein said actinide oxide-carbon microspheres comprise dehydrated urania-carbon-gel microspheres.

3. Crystalline microspheres consisting essentially of actinide mononitride, said microspheres having a density of at least 90 percent of theoretical.

4. Crystalline microspheres consisting essentially of uranium mononitride, said microspheres having a density of at least 90 percent of theoretical.

* * * * *